United States Patent [19]
Fisher

[11] 3,794,359
[45] Feb. 26, 1974

[54] ABRASION RESISTANT PIPE FITTING
[75] Inventor: James T. Fisher, Little Rock, Ark.
[73] Assignee: A. O. Smith-Inland Inc., Milwaukee, Wis.
[22] Filed: Oct. 30, 1972
[21] Appl. No.: 301,892

[52] U.S. Cl. .................................. 285/55, 285/179
[51] Int. Cl. ............................................. F16l 9/14
[58] Field of Search .......... 285/55, 179, 16, 15, 17; 138/140, 145, 146, 141; 302/64

[56] References Cited
UNITED STATES PATENTS
1,211,784  1/1917  Stuart ................................... 285/16
1,246,189  11/1917 Vanderlip .............................. 285/16
2,640,503  6/1953  Milligan et al. ..................... 138/141
3,551,006  12/1970 James .................................. 285/16

FOREIGN PATENTS OR APPLICATIONS
805,260  8/1936  France ................................ 138/146

Primary Examiner—Dave W. Arola
Attorney, Agent, or Firm—Andrus, Sceales, Starke & Sawall

[57] ABSTRACT

A tubular pipe fitting adapted to withstand abrasive and corrosive attack in changing the direction of fluid flowing therein. The fitting is made of a plurality of wear plates of ceramic material molded or cast to a semi-circular shape and assembled in circumferentially spaced opposed relationship in the area of the fitting subject to attack. Grout consisting of a mixture of epoxy resin and metallized ceramic pellets is disposed in semi-circular form in the circumferential space between the opposed wear plates and longitudinally of the fitting fiber glass filaments impregnated with resin which surround the wear plates and grout, and the entire assembly is cured to present a completed fitting.

5 Claims, 4 Drawing Figures

PATENTED FEB 26 1974　　　　　　　　　　3,794,359

ABRASION RESISTANT PIPE FITTING

BACKGROUND OF THE INVENTION

Tubular fittings which change the direction of flow of abrasive fluids have been made of materials such as steel, iron or iron alloy or resin reinforced fiber glass, and such fittings have been provided with abrasive resistant linings of elastomeric material or the like such as that disclosed in U. S. Pat. No. 3,551,006. The present invention provides a fitting with an internal construction or liner which locates the more abrasive and corrosive resistance material in the area most subject to attack while employing a less abrasive resistance material in the area less subject to abrasion but which will reduce the impact sensitivity of the fitting. Fiber glass and a resin matrix are applied over the liner or internal portion of the fitting and the fitting is cured to provide a composite structure.

SUMMARY OF THE INVENTION

The tubular fitting of the invention which is constructed of a shape to change the direction of flow of an abrasive and corrosive fluid flowing therein has an internal liner which is formed of a first set of a plurality of wear plates of semicircular shape constituting the inner wall of the liner. A second set of corresponding wear plates of semi-circular shape are disposed opposite to the inner plates and circumferentially spaced therefrom to provide the outer wall of the liner. The wear plates are of a non-metallic material processed at elevated temperatures such as of ceramic or volcanic basalt and are located in that portion of the fitting which will be subjected to the greatest abrasive and corrosive action from the flowing fluid. Preferably, the oppositely disposed wear plates at the respective ends of the fitting are of lesser thickness than the wear plates located in the body of the fitting to facilitate connecting the fitting to other tubular members.

The liner of the fitting is completed by grout comprising a mixture of a thermosetting resin such as epoxy and spherical particles or pellets of metallized ceramic. The grout is disposed in the circumferential spaces between the wear plates and extends throughout the length of the fitting. The grout is located in that portion of the fitting where a less abrasive and corrosion resistant material is required. The grout is employed to reduce the impact sensitivity of the fitting as well as to resist abrasive and corrosive attack from the flowing fluid.

The abrasive and corrosive resistant sweep fitting of the invention is completed by an outer layer of a mixture of thermosetting resin such as epoxy and fiber glass which supplies strength to the fitting necessary for both withstanding the pressure to which the fitting may be subjected and for handling the fitting. The fitting is cured to present a composite structure.

BRIEF DESCRIPTION OF THE DRAWING

The drawing furnished herewith illustrates the best mode of the invention presently contemplated by the inventor and discloses the above advantages and features as well as others which will be understood from the detailed description thereof.

In the drawing.

DESCRIPTION OF THE INVENTION

Figure 1:
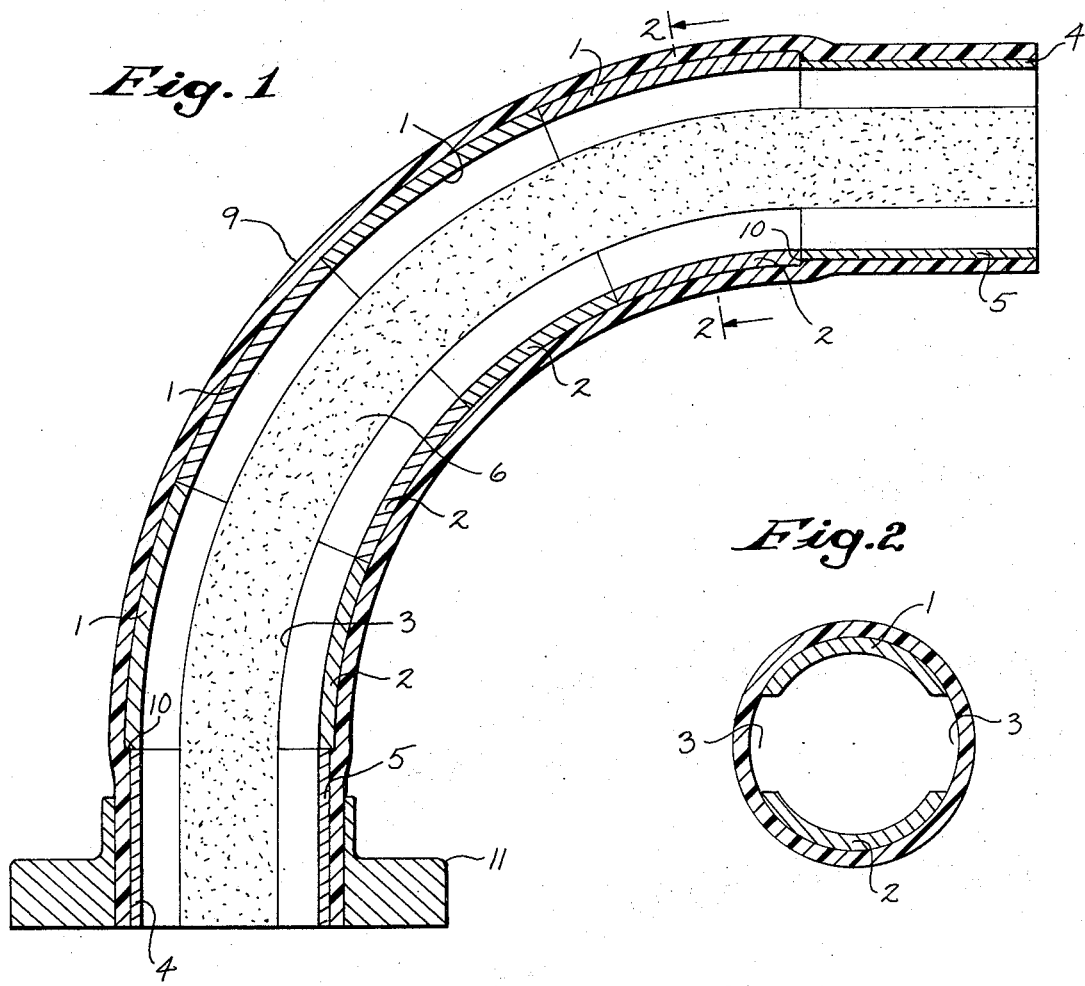
FIG. 1 is a longitudinal sectional view through the tubular fitting of the invention shown in the form of an elbow with parts in elevation.

The fitting of the invention is illustrated in the drawing in the shape of an elbow having a liner consisting of a set of outside wear plates 1 which are formed to the outside curvature of the liner of the fitting and a second set of inside wear plates 2 which are formed to the inside curvature of the liner of the fitting.

The wear plates 1 and 2 are cast or molded into semicircular form to very close tolerances and the material employed in them is non-metallic which is processed at an elevated temperature such as a ceramic or vitreous material like volcanic basalt.

Figure 2:
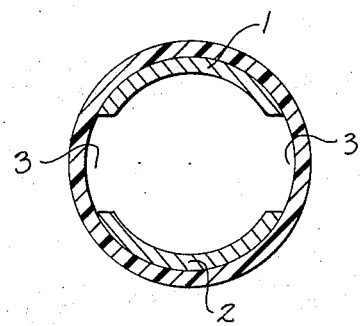
FIG. 2 is a view taken on line 2—2 of FIG. 1 with the grout removed.

The respective sets of wear plates 1 and 2 when assembled in matching relationship opposite each other to form the liner are spaced apart circumferentially at their inner ends from their counterpart wear plate as illustrated at 3 in FIG. 2. Plates 1 and 2 are also located in the fitting where they will receive the most abrasive and corrosive action to which the fitting will be subjected in service from the fluid flowing therein.

The matching wear plates 4 and 5 forming plates 1 and 2 at the respective ends of the liner are preferably thinner than those in the body of the liner to facilitate assembly of the fitting with other tubular members.

Figure 3:
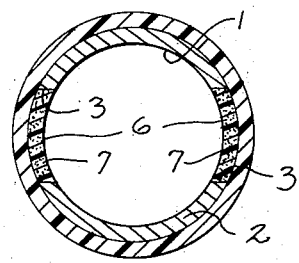
FIG. 3 is a view corresponding to FIG. 2 but with the grout in place.
Figure 4:
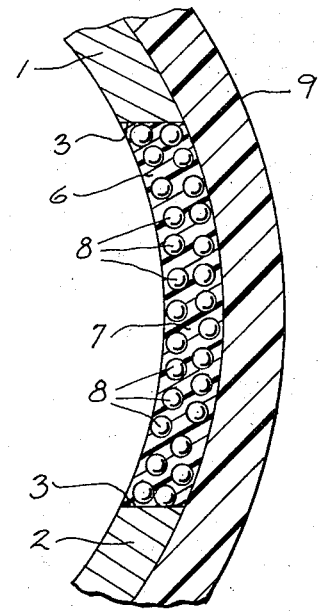
FIG. 4 is an enlarged section through the grout portion on one side of the view of FIG. 3.

The circumferential spaces 3 between the respective sets of plates 1 and 2 which extend the length of the fitting are filling with grout 6 as illustrated in FIGS. 1 and 3 which matches the contour of wear plates 1 and 2. Grout 6 is a mixture of a thermosetting resin 7 such as of epoxy and metal coated ceramic particles 8 as illustrated in FIG. 3.

Other thermosetting resins such as the polyesters or urethane may be employed. The particles 8 are preferably spherical in the form of small diameter pellets and particles of alumina oxide base and have been found satisfactory, but the particles may be of other shapes. The metal coatings on the particles 8 which at least cover a portion of the surface of the particles must be compatible with the resin to have good bonding ability with the resin. Lithium molybdate, titaneium and zirconium have been found to have the quality of metal coating desired.

The grout 6 serves to reduce the impact sensitivity of the fitting. However, grout 6 can also withstand the less abrasive and corrosive attack to which it is subjected by the fluid flowing therethrough because the area in the fitting in which grout 6 is located is removed from the greatest area of attack.

The fitting is completed by an outer layer 9 of a fiber glass and resin matrix which extends over the plates 1 and 2 and grout 6 to provide strength to the fitting for both pressure and handling. The entire fitting after application of the fiber glass and resin is cured to provide a composite structure.

Because of the thinner end wear plates 4 and 5, the completed fitting preferably will have somewhat lesser diameter at the ends to facilitate attachment to other tubular members.

At the area between the different thickness of wear plates 1 and 2 and 4 and 5, a fillet 10 is formed of the grout 6 to prevent a sharp step between the wear plates over which the outer layer 9 of resin and glass filaments extends.

As illustrated in FIG. 1, the usual standard flange 11 may be secured at each end of the fitting.

The fitting of the invention is made by casting or molding the plates 1 and 2 to the exact curvature desired in the fitting within close tolerance limits from a material which is processed under elevated temperature conditions.

The plates 1 and 2 are then assembled on a mandrel, not shown, with the ends of the respective matching inner and outer plates 1 and 2 spaced circumferentially from each other as shown in FIG. 2. While held on the mandrel, grout 6 is troweled into the spaces between the wear plates 1 and 2 and extends to match the contour of the wear plates.

After the grout has set, the outer layer 9 consisting of a thermosetting resin and fiber glass is applied over the plates 1 and 2 and grout 6 such as by spraying or wrapping and the fitting is then cured to form a composite structure.

The invention provides a fitting which can withstand substantial impact because of the grout and which locates the greatest resistant material in the fitting to abrasion and corrosion in the areas most subject to this type of attack when the fluid flowing in the fitting is changed in its course of flow by the shape of the fitting. In addition, the fitting is built for strength for handling and withstanding the pressures to which it would be subjected, by an outer layer of fiber glass and thermosetting resin which bonds the parts of the liner of the fitting together.

Various modes of carrying out the invention are contemplated as being within the scope of the following claims particularly pointing out and distinctly claiming the subject matter which is regarded as the invention.

I claim:

1. In a pipe fitting adapted to change the direction of the flow of an abrasive fluid therein, a pair of semi-circular wear plates of a non-metallic material processed at elevated temperatures to the proper shape and disposed substantially opposite each other with the inner ends of the plates circumferentially spaced apart from each other and disposed to form that part of the fitting which will be subjected to the greatest abrasive and corrosive attack by the fluid flowing in the fitting, a grout mixture of resin and compatible abrasive material disposed in the circumferential space between the wear plates in semi-circular form to match the contour of the wear plates and complete the inner portion of the fitting, and resin and fiber glass cured around the wear plates and grout to provide a composite fitting.

2. The pipe fitting of claim 1 in which the wear plates are of ceramic and the abrasive material of the grout is in the form of ceramic pellets with at least a part of the surfaces of the pellets coated with a metal disposed to adhere to the resin.

3. A pipe fitting elbow having a body portion and end portions adapted to change the direction of flow of an abrasive fluid therein, which comprises a plurality of ceramic wear plates, positioned within the body portion and at the end portions, formed to the shape of the fitting and provided by a set of inner wear plates and a set of outer wear plates disposed opposite each other, with one set circumferentially spaced from the other set and located in that portion of the elbow subjected to the greatest abrasive and corrosive attack in service, and a grout mixture of resin and compatible metallized ceramic pellets extending around the elbow in the space between said plates to complete the semi-circular inner portion of the pipe, and cured thermosetting resin and fiber glass extending around the plurality of inner and outer wear plates.

4. The pipe fitting of claim 3 in which the wear plates at the respective ends of the fitting are of lesser thickness than the wear plates forming the body of the pipe fitting.

5. The pipe fitting of claim 3, and a grout mixture of resin and metallized ceramic pellets disposed at the outer circumferential juncture of the thinner end wear plates and thicker body wear plates to provide a fillet preventing a sharp step between the plates.

* * * * *

UNITED STATES PATENT OFFICE
CERTIFICATE OF CORRECTION

Patent No. 3,794,359  Dated February 26, 1974

Inventor(s) James T. Fiser

It is certified that error appears in the above-identified patent and that said Letters Patent are hereby corrected as shown below:

Please correct the Inventor's name as follows:

Cancel "Fisher" and substitute therefor
       --- Fiser ---

Signed and sealed this 1st day of October 1974.

(SEAL)
Attest:

McCOY M. GIBSON JR.                    C. MARSHALL DANN
Attesting Officer                    Commissioner of Patents